ferred quantity can be ascertained from the equations which follow later. If the acidic reactant is liquid or solid it is merely added to the alcoholate. If however, it is gaseous it can be blown into the alcoholate as a steady stream.

United States Patent Office 3,591,496
Patented July 6, 1971

3,591,496
OVERBASED ADDITIVES
Michael A. Vickars, Wantage, and David A. Edwards, Oxford, England, assignors to Esso Research and Engineering Company
No Drawing. Filed July 8, 1968, Ser. No. 743,057
Claims priority, application Great Britain, July 12, 1967, 32,123/67
Int. Cl. C10m 1/48, 1/40, 1/24
U.S. Cl. 252—18  6 Claims

ABSTRACT OF THE DISCLOSURE

A process comprising preparing a complex by reacting $H_2S$ with an alkoxide of a polyvalent metal, which complex may be dispersed in oil in the presence of a dispersant, followed by heating to decompose said complex and form a dispersion of metal salt in said oil. The resulting metal salt dispersion is useful as a lubricating oil detergent.

---

This invention relates to overbased additives, especially useful as detergents for lubricating oils.

In order to reduce sludge formation in internal combustion engines and other machinery it is necessary to add detergents to the lubricating oil. Attempts have been made to increase the alkalinity or basicity of these detergents so that equivalent detergency can be obtained with a lower concentration of additive in the lubricating oil.

According to this invention basically reacting compounds, e.g. overbased additives of high basicity, can be obtained by a process which comprises reacting an alcoholate of a polyvalent metal of Groups I, II, III, or VIII of the Periodic Table with an acidic reactant (as hereinafter defined). f desired this reaction may be carried out in the presence of an oil-soluble dispersant or alternatively, the product of said reaction may be added to an oil-soluble dispersant.

The alcoholate can be prepared by reacting the metal itself, a carbide or a hydride of the metal, with an alcohol. The alcohol which is used is preferably an ether alcohol, e.g. one containing not more than six carbon atoms per molecule such as methoxy ethanol and ethoxyethanol. However higher chain length ether alcohols may be used. Alternatively aliphatic alcohols may be used, for example alcohols containing not more than six carbon atoms per molecule, e.g. methanol, ethanol, isopropanol, butanol, or hexanol. The metal from which the alcoholate is derived can be one of a large number of polyvalent metals, e.g. a Group Ib metal such as copper; a Group IIa metal such as magnesium, calcium or barium; a Group IIb metal such as zinc, a Group IIIb metal such as aluminium or a Group VIII metal such as iron, cobalt or nickel. The particularly preferred metals are those of Group IIa, especially calcium.

The acidic reactant is defined as a hydride or oxide of sulphur, selenium or tellurium; an oxide of nitrogen; an oxide or sulphide of phosphorus or arsenic; or an oxide of boron. The acidic reactant is preferably liquid or gaseous but can be solid, e.g. boron oxide, or phosphorus pentoxide. The preferred reactant is hydrogen sulphide, although sulphur dioxide or phosphorus pentoxide are very suitable. Other examples of acidic reactant are sulphur trioxide, selenium oxide, hydrogen telluride, phosphorus trioxide, phosphorus pentasulphide, and arsenic trisulphide.

The quantity of acidic reactant which is reacted with the alcoholate can vary according to the acidic reactant which is used. Thus for example, for bivalent metal alcoholates and hydrides of sulphur, selenium, and tellurium the quantity used is preferably between 0.75 to 1.25 moles per mole of alcoholate. For other acidic reactants the preferred quantity can be ascertained from the equations which follow later. If the acidic reactant is liquid or solid it is merely added to the alcoholate. If however, it is gaseous it can be blown into the alcoholate as a steady stream.

The oil-soluble dispersant can be an anionic, cationic or non-ionic dispersant, the preferred dispersants being sulphonates, phenates, phosphorus sulphide-treated hydrocarbons, carboxylic acids, or metal soaps thereof.

Suitable sulphonates include natural and synthetic sulphonates e.g. mahogany or petroleum alkyl sulphonates e.g. mahogany or petroleum alkyl sulphonates, or alkyl sulphonates or alkaryl sulphonates. The alkyl sulphonates should have at least 25 carbon atoms per molecule to be oil-soluble, whereas the alkaryl sulphonates need only at least 18 carbon atoms in the alkyl chain to be oil-soluble. The preferred molecular weight of the sulphonic acid radical is between 350 and 1000, e.g. between 400 and 700. Instead of the sulphonate the corresponding sulphonic acid may be used.

The alkyl phenates or the alkyl phenols should have at least 7 carbon atoms in an aliphatic chain to be oil-soluble. Examples are n-decyl phenol, cetyl phenol, nonyl phenol or the corresponding phenates, especially calcium alkyl phenates; or the corresponding phenol sulphides, e.g. nonyl phenol disulphide.

The phosphorus sulphide treated hydrocarbons are preferably phosphorus sulphide (e.g. $P_2S_5$) treated polyolefins, especially polyolefins having a molecular weight of between 500 and 1500, e.g. about 1000. Particularly suitable polyolefins are polyisobutenes, e.g. those having a molecular weight of about 1000. It is preferred that the phosphorus sulphide treated hydrocarbons be mixed with alkyl phenols or alkyl phenols and sulphonic acids.

Suitable carboxylic acids or metal soaps thereof are naphthenic acids and the higher fatty acids and metal soaps thereof. Suitable naphthenic acids include substituted cyclopentane mono and dicarboxylic acids having at least 15 carbon atoms for oil solubility, e.g. cetyl cyclohexane carboxylic acids, and dilauryl deca-hydro naphthalene carboxylic acids. Suitable oil-soluble fatty acids include those containing at least 8 carbon atoms, e.g. 2-ethyl hexoic acid, linoleic acid, chlorostearic acid or ricinoleic acid.

Suitable non-ionic dispersants include for example polyethylene glycol oleate, or polyoxethylene lauryl alcohol.

Suitable cationic dispersants include for example quaternary ammonium compounds of the formula

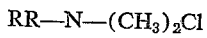

$$RR-N-(CH_3)_2Cl$$

where R and R are alkyl groups: polyalkenyl succinic anhydride/polyalkylene amine condensates or polyalkenyl carboxylic acid/polyalkylene amine condensates.

The reaction between the alcoholate and the acidic reactant can if desired take place in the presence of the oil-soluble dispersant. It is preferable however if the product of the reaction between the alcoholate and the acidic reactant (hereinafter called "the Complex") is added to the oil-soluble dispersant, preferably disoslved in an oil, e.g. a mineral oil. Should it be desired to carry out the reaction in the presence of the oil-soluble dispersant, this dispersant should preferably be dissolved in an oil, e.g. mineral oil.

The ratio between the complex and the oil-soluble dispersant can vary depending on the nature of the compounds. Thus, when an excess of the complex is added to an oil solution containing one equivalent of sulphonic acid (anionic dispersant) one equivalent of the complex will react with the sulphonic acid to give the metal sulphonate and hydrogen sulphide, while the remaining complex will be decomposed, probably to metal sulphide, particles of which will be dispersed in the oil by the sulphonate. The ratio of equivalents of complex to equivalents of sulphonic acid can vary therefore from 1:1 to 10:1 or even higher. Similar ratios apply to other anionic dispersants. To facilitate the decomposition, the mixture of complex and anionic dispersants can be heated. With cationic and non-ionic dispersants there is no chemical reaction with the complex, but the equivalent ratio of complex to dispersant can be of the same order i.e. greater than 1:1.

The structure of the reaction product between the alcoholate and the acidic reactant varies according to the nature of the reactant. For bivalent metal alcoholates and and hydrides of sulphur, selenium, and tellurium the reaction which takes place is believed to be as follows:

$$M(OR)_2 + H_2X \rightarrow M(XH)OR + ROH$$

where M is the metal and X is S, Se or Te.

For oxides of sulphur, selenium and tellurium the reaction which takes place is believed to be as follows:

$$M(OR)_2 + XO_2 \rightarrow M(XO_3R)OR$$

For an oxide or sulphide of phosphorus the following reactions are believed to take place:

$$2M(OR)_2 + P_2O_5 \longrightarrow \underset{\underset{OR}{|}}{ROMO}\overset{\overset{O}{\|}}{P}-O-\overset{\overset{O}{\|}}{\underset{\underset{OR}{|}}{P}}-OMOR$$

$$2M(OR)_2 + P_2S_5 \longrightarrow \underset{\underset{OR}{|}}{ROMS}\overset{\overset{S}{\|}}{P}-S-\overset{\overset{S}{\|}}{\underset{\underset{OR}{|}}{P}}-SMOR$$

Similar reactions may take place with oxides or sulphides of arsenic e.g.

$$2M(OR_2) + As_2O_3 \longrightarrow \underset{\underset{OR}{|}}{ROMO}As-O-\underset{\underset{OR}{|}}{As}-OMOR$$

or with boron trioxide i.e.

$$2M(OR)_2 + B_2O_3 \longrightarrow \underset{\underset{OR}{|}}{RO-M.O}-B-O-\underset{\underset{OR}{|}}{B}-OMOR$$

In order to improve the odour of the final additives prepared by the process of this invention a base such as an alkaline metal hydroxide e.g. KOH or NaOH or an alkaline earth metal oxide or hydroxide (e.g. $Ba(OH)_2$, CaO) may be added to the additive. Preferably the hydroxide or oxide is dissolved in an alcohol or ethoxyalcohol (e.g. methoxy ethanol or ethoxy ethanol). The alcohol which is used is preferably the same as that from which the alcoholate is derived. The preferred bases are alkali metal hydroxides, e.g. potassium hydroxide, especially a dilute solution thereof in an alcohol, e.g. 5% w./w. in methoxy ethanol. The quantity of base added need not be large e.g. between 10 and 30 wt. percent based on the weight of additive. This treatment of the additive with a base also results in a reduction of the corrosive properties of the additive.

An alternative method of improving the odour of the additives is to treat the additive preferably heated e.g. to a temperature of at least 80° C., with an alkylene oxide preferably ethylene oxide or propylene oxide. The oxide may be introduced for a period of time ranging from 10 to 45 minutes for example so that the quantity added may be quite small e.g. about 1% by weight based on the weight of additive. If desired the alkylene oxide treated additive may be heated under reflux, (e.g. at about 100° C.) for a period of time, e.g. for about 30 minutes.

EXAMPLE 1

An overbased additive was prepared from the following reactants:

100 gm. calcium turnings
900 gm. methoxy ethanol
78 gm. hydrogen sulphide

The calcium turnings were reacted with the methoxyethanol by refluxing the ethanol over the metal until the reaction started. The reaction was controlled by cooling in a water bath and when the reaction had slowed the mixture was refluxed overnight to complete the reaction. After the greenish turbid solution had cooled hydrogen sulphide was passed into the solution. The hydrogen sulphide when passed into the cold solution dissolved immediately but towards the end of the bubbling the $H_2S$ was no longer dissolving indicating that the reaction was complete. The product was filtered through a No. 3 sintered glass filter.

The analysis of the complex was as follows:

Sulphated ash=28.7 (=8.5% Ca)
Sulphur content=6.17%
Total yield=10.30 gm., 87.5 gm. Ca This complex was then slowly to a vigorously stirred dispersant solution of the following composition:

|  | Gm. |
|---|---|
| A synthetic $C_{19}$–$C_{20}$ alkyl benzene sulphonic acid [1] | 75 |
| Phosphosulphurised polyisobutene of average MW 950 | 75 |
| ($C_7$–$C_9$) alkyl phenols | 45 |
| Mineral oil | 400 |

[1] 70% active ingredient M.W. 450.

The mixture was heated to about 80° C. to decompose the complex and the temperature was then raised to distil off the bulk of the solvent alcohol. Final traces of volatile material were recovered at 200° C. leaving a stable overbased additive which analysed as follows:

| KV 210° F. (cs.) | 90 |
|---|---|
| 100° F. (cs.) | 156.3 |
| Sulphated ash (percent) | 37.7 |
| Sulphur content (percent) | 8.32 |
| TBN [1] (Castrol)(mgm. KOH/g.) | 305 |
| Specific gravity | 1.0423 |

[1] TBN is total base number.

EXAMPLE 2

In an alternative reaction 100 gm. of a similar complex to Example 1 but containing 8.0% Ca and 3.62% sulphur was added slowly to 80 g. of a natural calcium sulphonate (having a M.W. of 440 expressed as the sodium sulphonate). The mixture was heated to about 80° C. to decompose the complex and the temperature was raised to distill off the bulk of the solvent alcohol. Final traces of volatile material were removed as 200° C. leaving a stable overbased additive which analysed as follows:

| Sulphated ash (percent) | 37.3 |
|---|---|
| Calcium content (percent) | 11.0 |
| Sulphur content (percent) | 6.94 |
| TBN (Castrol) | 259 |

EXAMPLE 3

A $H_2S$/alcoholate complex solution was prepared using the following reactants:

|  | Gm. |
|---|---|
| Calcium turnings | 120 |
| Methoxy ethanol | 400 |
| Ethoxy ethanol | 700 |
| $H_2S$ | 95 |

The method of preparation was the same as that described in Example 1.

The yield of complex was 1200 gm., the calcium utilisation 80%, and the sulphated ash was 27.3% (=8.0% Ca).

300 gm. of the complex thus prepared was added slowly to dodecyl phenol dissolved in mineral oil as dispersant in the manner described in Example 1. The quantities used were as follows:

|  | Wt. percent charged |
|---|---|
| 300 gm. complex (percent as CaS) | 20 |
| 60 gm. dodecyl phenol (percent) | 30 |
| 100 gm. mineral oil (Stanco 150)(percent) | 50 |

The yield obtained was 200 gm. compared with a theoretical yield of 36 gm.
The analysis results were as follows:

TBN (Castro) (mgm. KOH/gm.)—360
Sulphated ash (percent)—42.15 (=12.5% Ca)
Sulphur content (percent)—8.84

EXAMPLE 4

The procedure of Example 1 was repeated to make $H_2S$/alcoholate solution, using the following reactants:

120 gm. calcium
1100 gm. 2-methoxy ethanol
95 gm. (approx.) $H_2S$ 1097 gm. of solution were obtained.

Some of the complex thus obtained was added slowly at 200° C. to an oil solution of naphthenic acid, the quantities used being:

50 gm. Naphthenic Acid 180
110 gm. mineral oil (Stanco 150)
300 gm. complex

The oil darkened with further addition and the final product was a clear-reddish brown solution which needed no filtration.
The analysis of the product was as follows:

Sulphur content—6.7%
Haze [1] (Nephelometer)—16.1 scale units
Sulphated ash—38.1%
Calcium—11.2%

[1] AMS 80/66A.

EXAMPLE 5

300 gm. of the complex obtained in Example 4 was added slowly at 200° C. to 40 gm. of oleic acid dissolved in 120 gm. of mineral oil (Stanco 150).
The analysis of the product was as follows:

Sulphur content—7.1%
Haze (Nephelometer)—25.5 scale units
Sulphated ash—37.4%
Calcium—11.0%

EXAMPLE 6

300 gm. of the complex obtained in Example 4 was added dropwise at about 150° C. to 30 gm. of a phosphosulphurised polybutene of molecular weight about 1000 and 15 gm. of nonyl phenol dissolved in about 100 gm. of mineral oil (Stanco 150).
The analysis of the product was as follows:

TBN (Castrol)—300 (mgm. KOH/gm.)
Sulphur content—7.9
Haze (Nephelometer)—29.0 scale units
Sulphated ash—38.7 weight percent
Calcium—10.9 weight percent

EXAMPLE 7

150 gm. of the complex solution prepared in Example 3 was added slowly to 20 gm. of the sulphonic acid used in Example 1 dissolved in 60 gm. of mineral oil (Stanco 150) in the manner described in Example 1.
The analysis results were as follows:

TBN (Castrol) mg. KOH/gm.—314
Sulphated ash—41.0%
Sulphur (Dietert)—9.2%
Calcium—12.2%

EXAMPLE 8

150 gm. of the complex solution prepared in Example 3 was added slowly to 30 gm. of the sulphonic acid used in Example 1, dissolved in 50 gm. of mineral oil (Stanco 150) in the manner described in Example 1.

TBN (Castrol) mgm. KOH/gm.—312.3
Sulphated ash—40.6%
Sulphur—9.2%
Calcium content—12.0%

EXAMPLE 9

150 gm. of the complex solution prepared in Example 3 was added slowly to 40 gm. of the sulphonic acid used in Example 1, dissolved in 40 gm. of mineral oil (Stanco 150) in the manner described in Example 1.
The analysis results were as follows:

TBN (Castrol) mg. KOH%g.—294.6
Sulphated ash—39.0%
Sulphur—8.6%
Calcium content—11.6%

EXAMPLE 10

A $H_2S$/alcoholate complex solution was prepared in the manner of Example 1 using:

120 gm. of calcium
1100 gm. dried ethoxyethanol
95 gm. $H_2S$ 1118 gm. of complex were obtained giving 6.0% Ca.
The complex was added slowly with vigorous stirring to a mixture of surfactants dissolved in mineral oil and maintained at 70° C. At 240° C. when the alcohol had distilled off, a dark clear brown oil was left. On filtration with "Superaid" the clarity of the oil was even better. The quantities of reactants were as follows:

|  | Weight, gms. | Weight, percent |
| --- | --- | --- |
| Sulphonic acid used in Example 1 | 360 | 30.0 |
| Nonyl phenol | 72 | 6.0 |
| Phosphosulphurised polybutene of MW 1000 | 180 | 15.0 |
| Mineral oil (Stanco 150) | 420 | 35.0 |
| Complex | 1,118 | [1] 14.0 |

[1] As CaS.

The analysis results of the resulting blend of complex and surfactants were as follows:

Viscosity KV 210° F.—44.9
Sulphated ash—19.4%
Calcium content—5.7%
Sediments AMS 80/70—trace
Haze (Nephelometer)—23 scale units
TBN (Castrol)—138 mg. KOH/g.
Sulphur (Dietert)—5.8%

EXAMPLE 11

600 gm. of calcium turnings were heated at a reflux temperature of 125° C. for 7 hours with 3080 gm. of methoxyethanol and then allowed to cool before filtering. A solution was obtained containing 8.1% calcium.
To prepare the complex the solution obtained (2000 gm.) was stirred at room temperature and $H_2S$ passed in until an increase in weight of 140 gm. was obtained. The temperature was kept below 40° C. by cooling.
500 gm. of an alkyl benzene sulphonic acid (Acid Number 81) was dissolved in 500 gm. of mineral oil (Stanco 150). This solution was heated to 200° C. with stirring and the above described complex was added maintaining the temperature at 190° to 200° whilst allowing the alcohol to distil off. When all was added the temperature was raised to 240° C. for 15 minutes with a nitrogen flow to remove the last traces of alcohol.

The resulting additive had the following properties:

TBN (Castrol) mg. KOH/gm.—315
Sulphated ash percent—41.8
Viscosity: KV at 100° F.—1318 cp.
KV at 210° F.—57.6 cp.

The odour of the additive was considerably improved by adding slowly 20% of a 5% w./w. solution of potassium hydroxide in methoxy ethanol while maintaining the temperature of the additive at 190° to 200° C. and allowing the alcohol to distil off. This treatment also reduced the corrosive properties of the additive towards metals used in the construction of diesel engines.

|  | Changes in weight of Hidurel 5 test piece percent |
|---|---|
| Untreated additive | 0.49 |
| KOH treated additive | 0.05 |

The corrosion test was carried out as follows: A disc of Hidurel 5 (DTD498) material, 1¼" diameter x ⅛" diameter was suspended in 150 ml. of oil containing 6% w./w. of the additive. The oil was heated to 250±5° C. and maintained at this temperature for 75 hours. At the termination of the test, the specimen was allowed to cool, removed from the oil and degreased in diethyl ether. It was then firmly wiped with cotton wool soaked in the same solvent to remove any loose coating of scale. The wiping was continued until the cotton wool remained clean. The specimen was then soaked in acetone, dried with blown air and reweighed. The percentage weight change was calculated. A change of more than ±0.05% is considered satisfactory. The composition of Hidurel material is as follows:

Nickel—2–3½ wt. percent
Silicon—0.4 to 0.8 wt. percent
Copper—Remainder

EXAMPLE 12

600 gm. of calcium carbide were refluxed for 24 hours with 3080° gm. of ethoxyethanol; cooled and filtered to give a solution containing 7.1% calcium.

To prepare the complex $H_2S$ was passed into 2000 gm. of this solution until an increase in weight of 125 gm. was achieved. The temperature was kept below 40° C. by cooling.

A mixture of 600 gm. of the sulphonic acid used in Example 1, 300 gm. of $P_2S_5$ treated polyisobutene and 120 gm. nonyl phenol were dissolved in 700 gm. of mineral oil (Stanco 150). This mixture was heated with stirring to 70° C. and the above described complex added with alcohol being removed by distillation until the temperature reached 240° C. The reaction mixture was held at this temperature for 15 minutes and then allowed to cool, giving an additive with the following properties:

TBN (Castrol) mg. KOH/g. _____ 177
Viscosity:
  KV at 100° F., cs. _____ 1184
  KV at 210° F., cs. _____ 58
Sulphated ash, percent _____ 24.0

Engine tests

A lubricating oil was made from the above additive as follows:

|  | Percent by weight |
|---|---|
| Mineral oil—Stanco 600 | 86 |
| Mineral oil—Stanco 150 | 8 |
| Additive | 6 |

The properties of this oil were as follows:
TBN (Castrol) mg. KOH/g. _____ 10.6
Viscosity:
  KV at 100° F., cs. _____ 118.2
  KV at 210° F., cs. _____ 12.0
  VI _____ 99
Sulphated ash, percent _____ 1.4

This oil was submitted to the Petter W1 oxidation test (1P Standard Method 176) and gave the following results.

Bearing weight change: +2.5 mgm.
Piston skirt lacquer rating: 10
Piston skirt interior: clean
Piston skirt undercrown: clean
Oil ring rating: 10
Ring sticking: all free A further test was carried out in a diesel engine. This test involved a Caterpillar 1-G engine (17–31 piston) run on 1% sulphur fuel without oil change for 168 hours. Oil was added as needed every 12 hours.

Piston cleanliness ratings were as follows:
Lands (max. 30) _____ 28.9
Grooves (max. 40) _____ 32.5
Undercrown (max. 10) _____ 7.1
Piston skirt varnish (10) _____ 9.95
Carbon deposit in top groove _____ 13

What is claimed is:

1. A process for preparing a dispersion of metal salt in oil comprising, reacting $H_2S$ with an alcoholate of a polyvalent metal and alcohol to thereby form a complex of $H_2S$ and metal alcoholate, and heating a dispersion of said complex in oil in the presence of a dispersant to decompose said complex into alcohol which is evaporated and said metal salt which is maintained dispersed in said oil by said dispersant, and wherein said metal is selected from the group consisting of polyvalent metals of Group Ib, IIa, IIb, IIIb and Group VIII.

2. A process according to claim 1, wherein said alcoholate is represented by the formula: $M(OR)_2$, said complex is represented by the formula: $M(SH)OR$; said R contains 1 to 6 carbon atoms, and M is a bivalent metal.

3. A process as claimed in claim 2 wherein said alcohol is an ether alcohol containing a maximum of 6 carbon atoms.

4. A process as claimed in claim 2 wherein said metal is calcium.

5. A process as claimed in claim 2, wherein the dispersant is selected from the group consisting of sulfonates, wherein the molecular weight of the sulfonic acid radical is between 350 and 1000; alkyl phenates having at least 7 carbon atoms in said alkyl groups; $P_2S_5$ treated polyolefins of 500 to 1500 mol. wt.; soaps of carboxylic acids of at least 8 carbon atoms and soaps of naphthenic acids of at least 15 carbon atoms.

6. A process according to claim 2 which further includes adding basic additive selected from the group consisting of alkali metal hydroxide and alkylene oxide.

References Cited
UNITED STATES PATENTS

| 2,616,904 | 11/1952 | Asseff et al. | 252—32.7E |
| 2,895,913 | 7/1959 | Carlyle et al. | 252—32.7 |
| 2,944,020 | 7/1960 | Verley | 252—32.7 |
| 2,956,018 | 10/1960 | Carlyle et al. | 252—39 |
| 3,277,002 | 10/1966 | Hunt et al. | 252—32.7 |

DANIEL E. WYMAN, Primary Examiner
I. VAUGHN, Assistant Examiner

U.S. Cl. X.R.

251—25, 32.7HC, 33, 39, 42.7, 52A